US011284493B2

(12) United States Patent
Polman et al.

(10) Patent No.: US 11,284,493 B2
(45) Date of Patent: Mar. 22, 2022

(54) LIGHTING SYSTEM

(71) Applicant: SIGNIFY HOLDING B.V., Eindhoven (NL)

(72) Inventors: Robertus Johannes Polman, Nijmegen (NL); Gerrit Jacob Kooy, Eindhoven (NL); David Oldenburger, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/053,874

(22) PCT Filed: May 7, 2019

(86) PCT No.: PCT/EP2019/061670
§ 371 (c)(1),
(2) Date: Nov. 9, 2020

(87) PCT Pub. No.: WO2019/215141
PCT Pub. Date: Nov. 14, 2019

(65) Prior Publication Data
US 2021/0235567 A1    Jul. 29, 2021

(30) Foreign Application Priority Data

May 8, 2018  (EP) .................................. 18171295
Jun. 14, 2018  (EP) .................................. 18177671

(51) Int. Cl.
*H05B 45/10* (2020.01)
*H05B 45/20* (2020.01)
(Continued)

(52) U.S. Cl.
CPC ......... *H05B 47/10* (2020.01); *G06F 3/04847* (2013.01); *H05B 45/10* (2020.01); *H05B 45/20* (2020.01); *H05B 47/19* (2020.01)

(58) Field of Classification Search
None
See application file for complete search history.

(56) References Cited

U.S. PATENT DOCUMENTS

2015/0022123 A1    1/2015   Van De Sluis et al.
2015/0257238 A1*   9/2015   Paradiso .............. H05B 47/175
                                                          315/132

(Continued)

FOREIGN PATENT DOCUMENTS

EP           3226660 B1      10/2018
WO        2014147510 A1       9/2014
WO        2017167675 A1      10/2017

*Primary Examiner* — Anh Q Tran (57) ABSTRACT

A controller for controlling at least a first lighting device and a second lighting device, the controller comprising a communication unit for communicating with the first and second lighting device, a user interface for receiving user input, a display unit, and a processor for rendering, on the display unit, a graphical representation of a first color spectrum, a first type of graphical representation of the first lighting device in the first color spectrum at a first position in the user interface, a second type of graphical representation of the second lighting device in the first color spectrum at a second position in the user interface, wherein the first type of graphical representation is indicative for the first lighting device being arranged for generating light matching a color of the first color spectrum associated with the first position in the user interface, and the second type of graphical representation is indicative for the second lighting device not being arranged for generating light matching a color of the first color spectrum associated with the second position in the user interface. The processor is further arranged for controlling, upon receiving a first user input for controlling the first lighting device via the user interface, via the communication unit, the color of one or more of the first and second lighting device according to the first user input.

15 Claims, 6 Drawing Sheets

(51) Int. Cl.
  *H05B 47/10* (2020.01)
  *H05B 47/19* (2020.01)
  *G06F 3/0484* (2013.01)
  *G06F 3/04847* (2022.01)

(56) References Cited

U.S. PATENT DOCUMENTS

| | | |
|---|---|---|
| 2016/0255706 A1 | 9/2016 | Kim et al. |
| 2017/0354019 A1 | 12/2017 | Julian et al. |
| 2018/0324921 A1* | 11/2018 | Aliakseyeu ............ H05B 45/20 |
| 2019/0114062 A1* | 4/2019 | Niemantsverdriet ....................... H05B 47/155 |
| 2020/0026420 A1* | 1/2020 | Sicard .................... H05B 45/10 |

* cited by examiner

LIGHTING SYSTEM

CROSS-REFERENCE TO PRIOR APPLICATIONS

This application is the U.S. National Phase application under 35 U.S.C. § 371 of International Application No. PCT/EP2019/061670, filed on May 7, 2019, which claims the benefit of European Patent Application No. 18171295.1, filed on May 8, 2018 and European Patent Application No. 18177671.7, filed on Jun. 14, 2018. These applications are hereby incorporated by reference herein.

FIELD OF THE INVENTION

The invention relates to a controller for controlling a first and a second lighting device, a method for controlling a first and a second lighting device, a computer program product, and a lighting system comprising the controller and the first and second lighting device.

BACKGROUND

Home and office lighting control systems enable users to control lighting devices that are distributed throughout the space. A user can select a lighting device, for instance by selecting it on a user interface of a mobile device such as a mobile phone and provide a user input to change the light output (e.g. intensity, color, direction, etc.) of the lighting device. These user interfaces further enable users to select one or more lighting devices and to set the color of the light to be generated by these one or more lighting devices, for instance by dragging an icon of a first lighting device along a virtual color spectrum via a touch screen of the mobile device. When the desired color is selected, the user can control the lighting devices to generate light of the desired color, including white light of a desired color temperature.

US2015/022123 A1 discloses a lighting system comprising a set of light sources and a remote control unit. The remote control unit comprises a user interface through which a user may identify an area in an image and a light source. The identified image area is linked with the light source and color information of the identified image area is transmitted to the light source. The light source is thereby enabled to adapt its light output to the color information. A user is thereby enabled to pick the color to be outputted by a light source by selecting an area in an image displayed on the remote control unit.

WO2017/167675 A1 discloses a controller for controlling a group of lighting devices. The group comprises a first lighting device and a second lighting device. The controller comprises a communication unit for communicating with the first and second lighting devices. The controller further comprises a display for rendering a hierarchical representation of the first and second lighting devices, comprising: a primary level comprising a first primary graphical representation and a second primary graphical representation, wherein the first primary graphical representation is associated with the first lighting device and representative of the first current light setting, and wherein the second primary graphical representation is associated with the second lighting device and representative of the second current light setting, and a secondary level comprising a secondary graphical representation, which secondary graphical representation is associated with the group of lighting devices and representative of the current group light setting of the group of lighting devices. The one or more of the first and second lighting devices are controlled according to user input, and the primary and secondary graphical representations are updated according to an adjustment provided via user input.

US 2016/255706 A1 discloses a lighting system having a lighting device, and a graphic user interface displayed on a touch screen of a lighting control device to control the lighting device. The graphic user interface includes a first region to display a map for an installation space of the lighting device and a lighting icon corresponding to the lighting device in the map; and a second region to display a menu for setting a control condition of the lighting device corresponding to the lighting icon. The map includes a plurality of division spaces obtained by dividing the installation space into a plurality of regions and the lighting icon is displayed in a specific division space corresponding to an actual installation portion of the lighting device.

SUMMARY OF THE INVENTION

The inventors have realized that when a user controls different types of lighting devices with different capabilities, not all lighting devices may be able to be generate the desired color of light. If, for example, a user would like to select red light, a tunable white lighting device (i.e. a lighting device configured to emit white light, wherein the color temperature of the white light is adjustable) is not suitable to generate that color of light as the tunable white lighting device may not be able to render certain colors (e.g. red or green). If, for example, a user would like to select white light, a multi-color lighting device (e.g. a multi LED lighting device with an adjustable color) may not suitable to generate that light. This creates a problem, because when the user would select a green color for a tunable white lighting device, it is not able to render this green color. When a user has installed multiple (types of) lighting devices in the same room, it may be difficult for the user to remember what the capabilities of the multiple lighting devices are for creating different colors of light (including white light and tunable white light). Thus, when the user would want to change the color of the light in a certain room to red, for example, a tunable white lighting device is not suitable for this choice, which may confuse the user which light source to select. In addition, the user interface that is used by the user may not report to the user that a specific lighting device cannot be used to create a desired color effect. Furthermore, the user may want to control multiple lighting devices with different color rendering capabilities by means of one user interface, so without having to switch between multiple user interface in order to be able to control the multiple lighting devices.

It is therefore an object of the present invention to communicate to a user what are the capabilities of different types of lighting devices and how they can be controlled. It is a further object of the present invention to provide a method and controller for selecting and controlling different types of lighting devices, and that reports to the user that a specific lighting device may not be suitable to create a desired color effect.

According to the invention, a controller for controlling at least a first lighting device and a second lighting device is provided, the controller comprising:

a communication unit for communicating with the first and second lighting device, a user interface for receiving user input, a display unit, a processor for rendering, on the display unit, a graphical representation of a first color spectrum, a first type of graphical representation of the first lighting device in the first color spectrum at a first position in the user interface, a second type of graphical representation of the second lighting device in the first color spectrum at a second position in the user interface, wherein the first type of graphical representation is indicative for the first lighting device being arranged for generating light matching a color of the first color spectrum associated with the first position in the user interface, and the second type of graphical representation is indicative for the second lighting device not being arranged for generating light matching a color of the first color spectrum associated with the second position in the user interface, wherein the processor is further arranged for controlling, upon receiving a first user input for controlling the first lighting device via the user interface, via the communication unit, the color of one or more of the first and second lighting device according to the first user input. By providing different graphical representations the user knows which lighting devices are suitable for the selected color spectrum. In addition, it allows to combine multiple user interfaces into one user interface, so the user does not have to switch between different user interfaces. The wording "being arranged for generating light" may refer to the technical capability (for example, availability of the correct type of light emitting diodes in the lighting device) of the lighting device to generate such light or it may refer to whether the last setting (for example color of light that was selected) matches with such light.

In an embodiment of the controller, the processor is further arranged for:

moving, upon receiving a second user input for controlling the second lighting device via the user interface, the second graphical representation of the second lighting device in the first color spectrum associated with the second position in the user interface to a third position in the user interface, wherein the second lighting device is being arranged for generating light matching a color of the first color spectrum associated with the third position in the user interface, and for switching to the first type of graphical representation for the second lighting device. In case the user interacts with the second lighting device, the position and/or of its graphical representation in the user interface may be changed such that it indicates a position in the color spectrum for which the lighting device is suitable, if any. The third position may be a different position in the user interface compared to the second position. In some embodiments, the third position may be the same position in the user interface as the second position.

In an embodiment of the controller, the color of the first color spectrum associated with the first position in the user interface is associated with one or more pixels at the first position in the user interface and wherein the color of the first color spectrum associated with the second position in the user interface is associated with one or more pixels at the second position in the user interface. The color of the pixels in the user interface indicate which color is selected by the user, for example.

In an embodiment of the controller, the processor is further arranged for:

obtaining color rendering information from the first lighting device and the second lighting device, wherein the color rendering information relates to color rendering capabilities of the first lighting device and the second lighting device, respectively, determining, based on the color rendering information, whether the first lighting device and the second lighting device are being arranged for generating light matching the color of the first color spectrum associated with the first position and the second position in the user interface, respectively, rendering, on the display unit, the first and the second lighting device according the first graphical representation and the second graphical representation, respectively. By obtaining the color rendering information from the lighting devices the information of the lighting devices is easily updated when adding or replacing lighting devices, for example.

In an embodiment of the controller, the processor is further arranged for, upon receiving a third user input for controlling the second lighting device via the user interface, rendering on the display unit:

a graphical representation of a second color spectrum, the first color spectrum being different from the second color spectrum, the second type of graphical representation for the first lighting device in the second color spectrum at the first position in the user interface, if the first lighting device is not being arranged for generating light matching a color of the second color spectrum associated with the first position in the user interface, the first type of graphical representation for the second lighting device in the second color spectrum at the second position in the user interface indicating that the second lighting device is being arranged for generating light matching a color of the second color spectrum associated with the second position in the user interface, and for controlling, via the communication unit, the color of one or more of the first and second light sources according to the third user input. In case the user manually interacts with a lighting device that is not suitable for the currently selected color spectrum, the controller switches to a different color spectrum, for which the lighting devices has the ability to generate light.

In an embodiment of the controller, the processor is further arranged for, upon receiving a user input via the user interface, rendering on the display unit:

a graphical representation of a third color spectrum, the third color spectrum being different from the first color spectrum, the second type of graphical representation for the first lighting device in the third color spectrum at the first position in the user interface indicating that the first lighting device is not being arranged for generating light matching a color of the third color spectrum associated with the first position in the user interface, the first type of graphical representation for the second lighting device in the third color spectrum at the second position in the user interface, if the second lighting device is being arranged for generating light matching a color of the third color spectrum associated with the second position in the user interface. In case a user switches to a different color spectrum, the ability of the lighting devices to generate light corresponding to that color spectrum is indicated to the user by changing the graphical representation of the corresponding lighting devices, if necessary. In an embodiment, the ability of the lighting device to generate light is based on the last setting (e.g. color or color temperature) that was used for that lighting device.

In an embodiment of the controller, the processor is further arranged for, upon receiving a fourth user input via the user interface to:

move the first type of graphical representation of the first lighting device in the first color spectrum from the first position in the user interface to a fourth position in the user interface and/or to move the second type of graphical representation of the second lighting device in the first color spectrum from the second position in the user interface to fifth position in the user interface, and switch, on the display unit, to a fourth color spectrum wherein the fourth color spectrum is indicative for the first lighting device not being arranged for generating light matching a color of the first color spectrum associated with the fourth position in the user interface and/or the second lighting device not being arranged for generating light matching a color of the first color spectrum associated with the fifth position in the user interface. In case a user moves the graphical representation of a lighting devices to a position in the color spectrum at the user interface for which the corresponding lighting device is not arranged to generate light, the color spectrum will switch to a neutral appearance to notify the user.

The color spectra are rendered in the same area of the user interface such that only a single color spectrum is rendered at a certain point in time. By rendering only a single color spectrum at a certain point in time a relatively easy user interface is provided to the user.

In an embodiment of the controller, the processor is further configured to set an initial first position for the first type of graphical representation in the user interface and/or an initial second position for the second type of graphical representation in the user interface based on the current color setting of the first lighting device and the second lighting device, respectively. By choosing the current color setting of a lighting device for setting the position of the graphical representation in the user interface the user keeps a good overview of the available lighting devices based on their last setting. Setting may refer to the color or white appearance (correlated color temperature) of the light.

In an embodiment of the controller, the display unit has a touch sensitive display, and wherein the user interface is arranged to receive the user input via the touch sensitive display. By providing a touch sensitive display a user friendly interface is provided.

According to the invention, a method for controlling a first lighting device and a second lighting device is provided, the method comprising the steps of:

rendering, on a display unit, a graphical representation of a first color spectrum, a first type of graphical representation of the first lighting device in the first color spectrum at a first position in a user interface, a second type of graphical representation of the second lighting device in the first color spectrum at a second position in the user interface, wherein the first type of graphical representation is indicative for the first lighting device being arranged for generating light matching a color of the first color spectrum associated with the first position in the user interface, and the second type of graphical representation is indicative for the second lighting device not being arranged for generating light matching a color of the color spectrum associated with the second position in the user interface, controlling, upon receiving a first user input for controlling the first lighting device via the user interface, a color of one or more of the first and second light sources according to the first user input.

In an embodiment, the method, further comprises the step of:

obtaining color rendering information from the first lighting device and the second lighting device, wherein the color rendering information relates to color rendering capabilities of the first lighting device and the second lighting device, respectively, determining, based on the color rendering information, whether the first lighting device and the second lighting device are being arranged for generating light matching the color of the first color spectrum associated with the first position and the second position in the user interface, respectively, rendering the first and the second light source according the first graphical representation and the second graphical representation, respectively.

In an embodiment of the method, the first color spectrum and the second color spectrum are being rendered in the same area of the user interface.

According to the invention, a computer program product for a computing device is provided, the computer program product comprising computer program code to perform the method according to the invention when the computer program product is run a processing unit of the computing device.

According to the invention, a lighting system is provided comprising a controller according to the invention, at least a first lighting and a second lighting device configured to receive control commands from the controller.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF THE EMBODIMENTS

Figure 1:
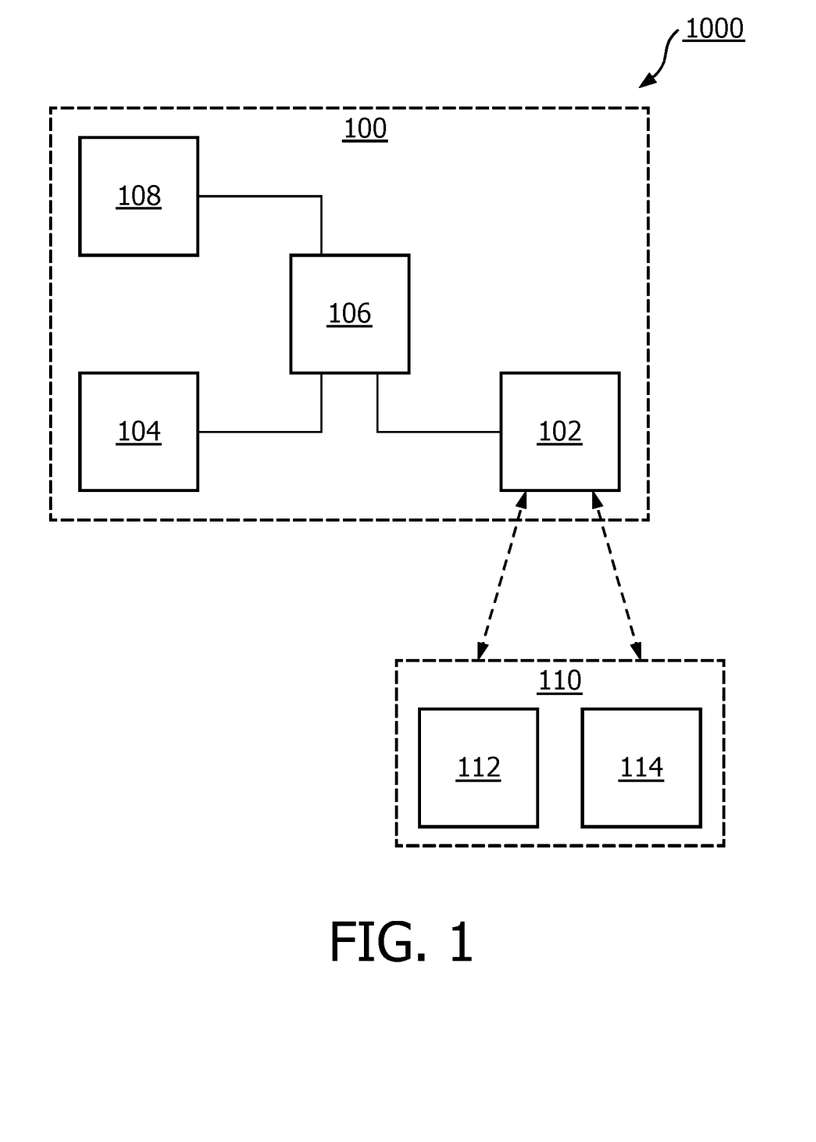
FIG. 1 shows schematically an embodiment of a lighting system according to the invention.

FIG. 1 shows schematically an embodiment of a lighting system 1000 that comprises a controller 100 for controlling a group 110 of lighting devices 112, 114. The group 110 of lighting devices 112, 114 comprises a first lighting device 112 and a second lighting device 114. The group 110 may contain additional lighting devices. The controller 100 comprises a communication unit 102 for communicating with the first and second lighting devices 112, 114, and for receiving a light setting of the first lighting device 112 and a light setting of the second lighting device 114. The controller 100 further comprises a display unit 108 and a processor 106 for rendering, on the display, a graphical representation of a first color spectrum and a second color spectrum. This graphical representation may comprise a color wheel that shows the various colors that can be selected by the user. The controller 100 further comprises a user interface 104 for receiving user input indicative of an adjustment of light setting for the first lighting device 112 and/or the second lighting device 114. The processor 106 is further arranged for controlling, via the communication unit 102, one or more of the first and second lighting devices 112, 114 according to the user input. The processor 100 is further arranged for rendering, on the display unit 108, a graphical representation of the first lighting device 112 and the second lighting device 114. This graphical representation comprises a first type of graphical representation that is indicative for the lighting device 112, 114 being arranged for generating light matching a color of a color spectrum associated with their respective position in the user interface, and a second type of graphical representation that is indicative for a lighting device 112, 114, not being arranged for generating light matching a color of a color spectrum associated with their respective position in the user interface.

The controller 100 may be any type of control device arranged for communicating with lighting devices 112, 114. The controller 100 may be a smart device, such as a smartphone or a tablet, or the controller 100 may be a wearable device, such as a smart watch. Alternatively, the controller 100 may be comprised in a home or office automation system. The communication unit 102 of the controller 100 is arranged for communicating with the lighting devices 112, 114. The communication unit 102 may be arranged for communicating with the lighting devices 112, 114 directly, or via any intermediate device (such as a hub, a bridge, a proxy server, etc.). The communication unit 102 may transmit lighting control commands (for example as signals, messages, data packets, etc., comprising lighting control instructions to change the color, saturation and/or brightness of the light output of the lighting device) to one or more receivers of one or more of the devices in order to control the light output of the lighting devices according to the user input. The communication unit 102 is further arranged for receiving a light setting of the first lighting device 112 and a light setting of the second lighting device 114 (for example by receiving signals/messages/data packets comprising light setting values related to the color, saturation and/or brightness of the light setting of the lighting device). These received signals/messages/data packets relate to an (active) light setting of the lighting devices 112, 114. The communication unit 102 may transmit/receive messages, signals or data packets via any communication protocol (e.g. Wi-Fi, ZigBee, Bluetooth, 3G, 4G, LTE, DALI, DMX, USB, power over Ethernet, power-line communication, etc.). It may be beneficial if the controller 100 is arranged for communicating via a plurality of communication channels/protocols, thereby enabling the transmission/reception of messages, signals or data packets to/from a plurality of types of lighting devices.

The lighting devices 112, 114 may be any type of lighting devices arranged for receiving lighting control commands. The lighting devices 112, 114 may comprise an LED light source, an incandescent light source, a fluorescent light source, a high-intensity discharge light source, etc. The lighting devices 112, 114 may be arranged for providing general lighting, task lighting, ambient lighting, atmosphere lighting, accent lighting, indoor lighting, outdoor lighting, etc. The lighting devices 112, 114 may be installed in a luminaire or in a lighting fixture, or the lighting devices 112, 114 may be standalone lighting devices such as LED strips/matrices. Alternatively, the lighting devices may be portable lighting devices (e.g. a hand-sized device, such as an LED cube, an LED sphere, etc.). In this embodiment, lighting device 112 is a tunable white lighting device (i.e. a lighting device configured to emit white light, wherein the color temperature of the white light is adjustable) and lighting device 114 is a multi-color lighting device (e.g. a multi LED lighting device with an adjustable color), that may optionally also being arranged to generate white light.

The processor 106 is further arranged for controlling, via the communication unit 102, one or more of the first and second lighting devices 112, 114 according to the user input. The processor 106 may control lighting devices according to light settings or light scenes, which may be predefined and stored in a memory, which memory may be accessible by the processor 106. Such light settings or light scenes may comprise information of lighting control settings for the plurality of lighting devices (a light setting/light scene may, for example, comprise instructions to set the first lighting device 112 to a first color and the second lighting device 114 to a second color).

The display unit 108 of the controller 100 may comprise a touch sensitive surface as the user interface 104, the touch sensitive surface being arranged for receiving user input. Alternatively, the user interface 104 may comprise a pointing device, such as a mouse device or a stylus pen, which may be operated by the user in order to provide the user input. The user interface 104 may be further arranged for receiving the user input at the first primary graphical representation, the second primary graphical representation or the secondary graphical representation.

The processor 106 (a microchip, circuitry, a microcontroller, etc.) is arranged for rendering, on the display unit 108, a graphical representation of a first color spectrum and a second color spectrum, as well as a graphical representation of the first lighting device 112 and the second lighting device 114. An example of a display unit 108 is given in FIG. 2. The display unit 108 renders a user interface 202. The user interface 202 comprises a graphical representation of a first color spectrum 204 that includes multiple colors as well as white. The desired color spectrum can be selected via color spectrum control options 206, 208. Color spectrum control option 206 allows to select a full color and white light spectrum and color spectrum control option 208 allows to select a tunable white color spectrum. The display unit 108 also renders a graphical representation 210 of the first lighting device 112, a graphical representation 212 of the second lighting device 114 and a graphical representation 214 of a third lighting device. The third lighting device is only capable of generating white light of a predetermined color temperature. The graphical representations 210, 212 and 214 allow to control the lighting devices by selecting the desired color of light to be generated by the respective lighting device by moving these graphical representations within the first color spectrum 204 via the user interface 202. These graphical representations may also be used to switch the lighting devices on or off. The position of the graphical representations 210, 212 and 214 in the user interface 202 may be based on the current color setting of the first, second and third lighting device, respectively. The position of the graphical representations 210, 212 and 214 may alternatively be predetermined by the controller 100 when switching on the controller 100. The graphical representations 210, 212 and 214 may have a different position in the color spectrum 204 on the user interface 202, or they may have an identical position (i.e. they all select the same color in the color spectrum). The graphical representation 210 is positioned in the color spectrum 204 such that a blue color is selected as the preferred color of light. As the first lighting device 212 is a tunable white lighting device, it is not capable of generating a blue color of light and that is indicated to the user by means of a graphical representation 210 having a relatively reduced brightness compared to graphical representation 212. In alternative embodiments, the degree of reduction in brightness may be varied depending of the degree of incapability of the lighting device to generate the desired color of light, meaning how much the difference is between the selected type of light and the type of light that the lighting device is capable to generate and that is closest to the selected type of light. For example, a lighting device with green and blue light emitting diodes may be able to generate whitish type of light, but is less suitable to generate warm white light. Alternatively, the graphical representation 210 may indicated by having a cross on its icon or it may be blinking, compared to the graphical representation 212. In further alternative embodiments, the graphical representations 210 may be indicated with different opacity to indicate whether a lighting device is suitable to generate light corresponding to the selected color spectrum. In further alternative embodiments, the graphical representations in the color spectrum for the various lighting devices is based on the type of lighting device versus the type of color spectrum that is selected. For example, in a multi-color spectrum (that may include white light), the graphical representation of a (tunable) white lighting device is always shown in reduced brightness and the graphical representation of a multi-color device is always shown in normal brightness, whereas in a tunable white spectrum the graphical representation of a multi-color lighting device is always shown in reduced brightness (although it may be capable of generating whitish light) and that of (tunable) white lighting device is always shown in normal brightness. Returning to FIG. 2, graphical representation 212 has an increased brightness compared to graphical representation 210, as the second lighting device 114 is a multi-color device that is arranged to generate an orange/red color as selected via the graphical representation 212. The graphical representations 214 is positioned in the color spectrum 204 such that a slightly yellow/orange color is selected as the preferred color of light. As the third lighting device is a white lighting device, it is not capable of generating a yellow/orange color of light and that is indicated to the user by means of a graphical representation 214 having, just as graphical representation 210, a relatively reduced brightness compared to graphical representation 212. Hence, for a selected color spectrum 204 it is clear to the user which of the available lighting devices are capable of generating a color of light that is selected via the user interface 202. In this embodiment, the controller 100 determines whether the lighting devices 112, 114 are generated to create a desired color as follows. The controller 100 obtains from the lighting devices 112, 114 color rendering information that is related to the color rendering capabilities of the respective lighting devices. The controller 100 also determines what is the desired color setting of the lighting devices 112, 114 by determining for each lighting device the color of the pixels in the color spectrum 204 as given by the position of the graphical representations 210, 212 of the respective lighting devices 112, 114 in the user interface 202. By comparing the desired color settings of the lighting devices 112, 114 with their respective color rendering capabilities, controller 100 determines whether a lighting device is arranged to generate the desired color setting.

Figure 3:
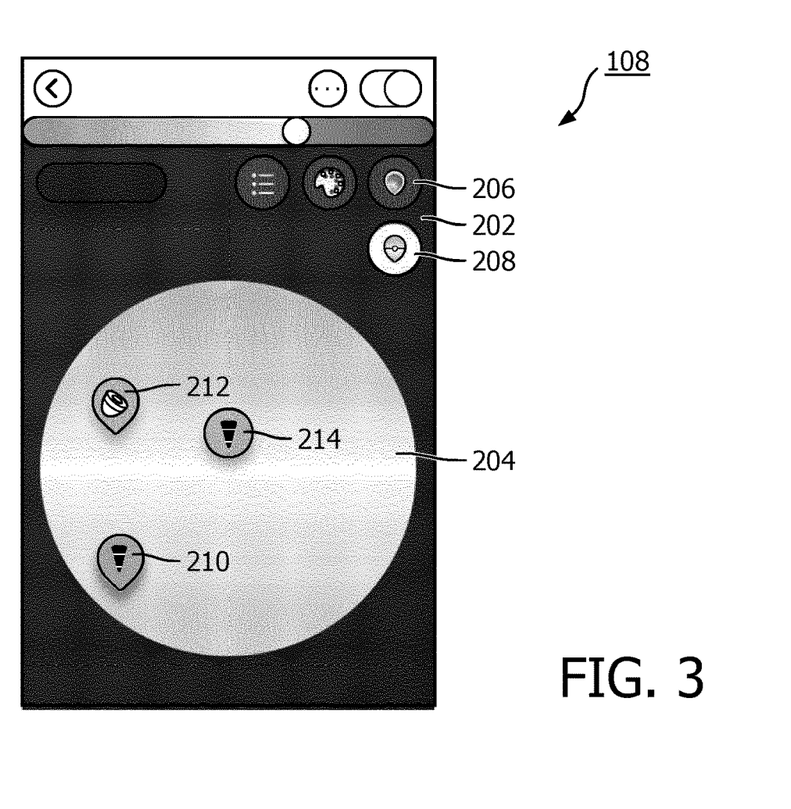

FIG. 3 shows the display unit 108 after a user has switched to a tunable white light spectrum via control option 208 and this tunable white light spectrum is shown on the user interface 202. The graphical representations 210, 212 and 214 are shown at the same position in the user interface 202. The graphical representation 212 is now shown in reduced brightness as the second lighting device 214 is not capable of generating the selected color of white light. The graphical representations 210 and 214 are shown at increased brightness as the first light lighting device 212 and the third lighting device, respectively, are capable of generating the selected color of white light.

Figure 2:
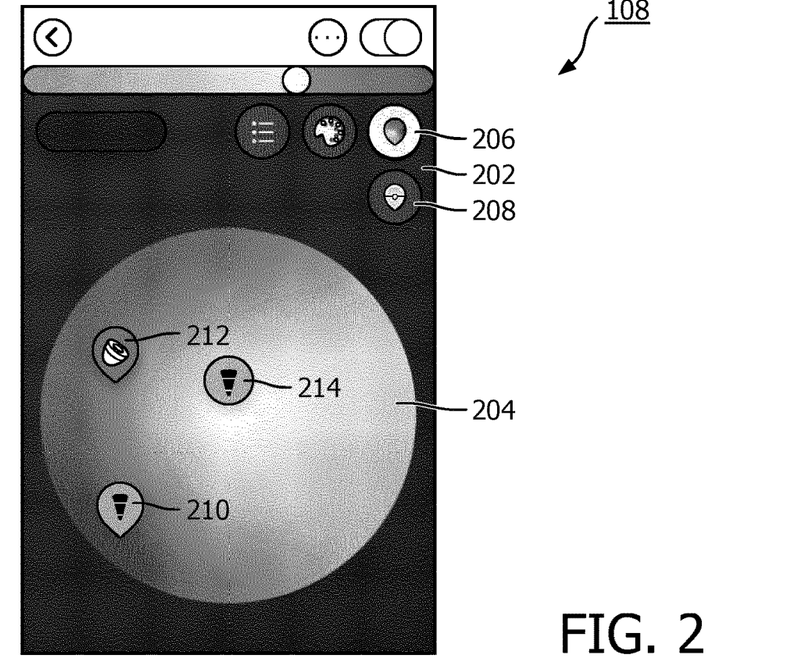
FIGS. 2-9 show schematically display units of a controller according to the invention.
Figure 4:
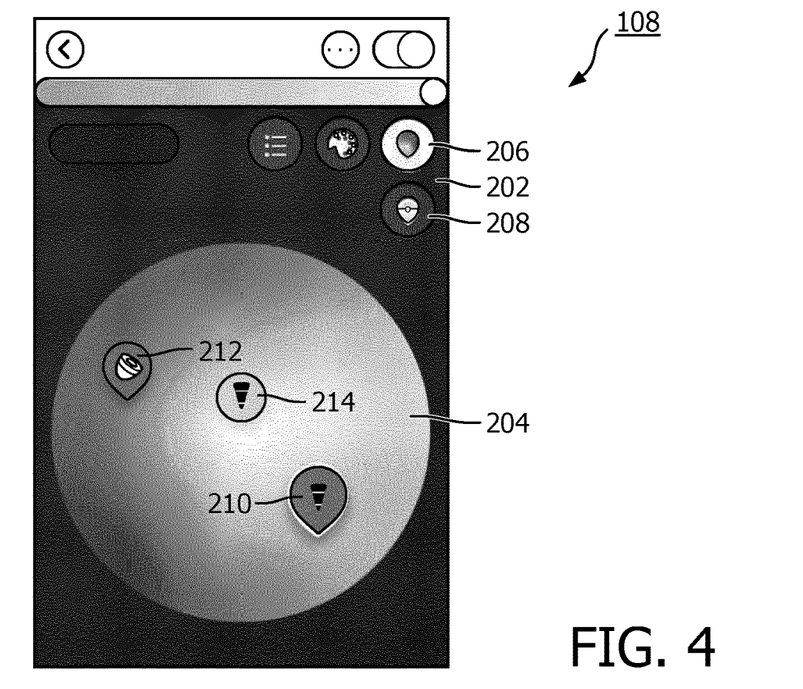

FIG. 4 shows a display unit 108 wherein a user, starting from a display unit as shown in FIG. 2, has moved the graphical representation 210 from the position in the user interface 202 as shown in FIG. 2 to the position as shown in FIG. 4. As the first lighting device 212 is arranged to generate the color of light that is associated with the position in the color spectrum 204 of FIG. 4, the graphical representation of 210 now has the same brightness as that of graphical representation 212 to indicate to the user that the first lighting device 212 may be used to generate the desired light. In an alternative embodiment, the lighting device 212 may have multiple capabilities, for example able to generate both different types of colored light as well as white light. In such case by interacting with the graphical representation 210 it may change to the first type of graphical representation at the same position in the user interface 202 as it may not have been able to generate the selected type of light based on the last used setting for lighting device 202 but it does have the technical capability to do so.

Figure 5:
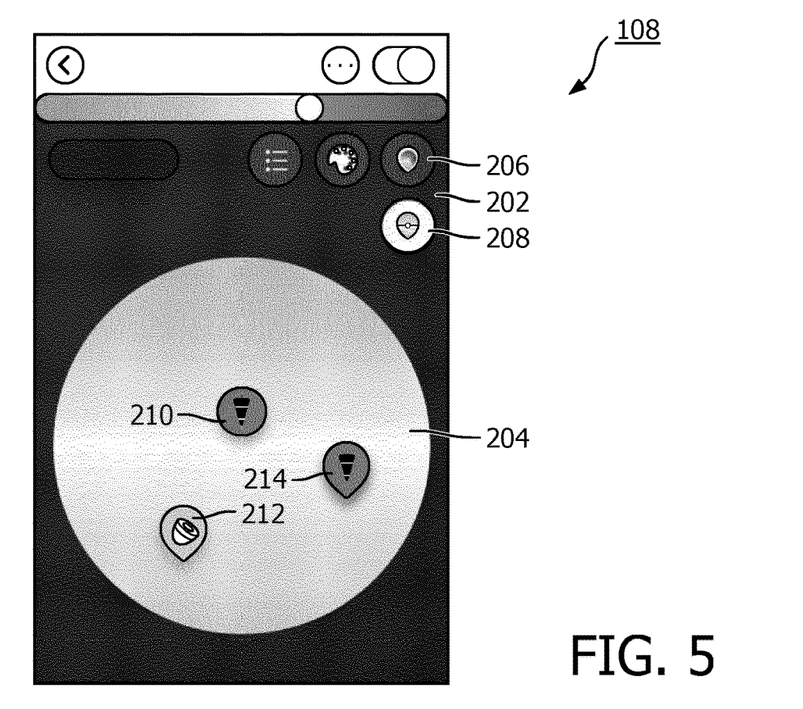
Figure 6:
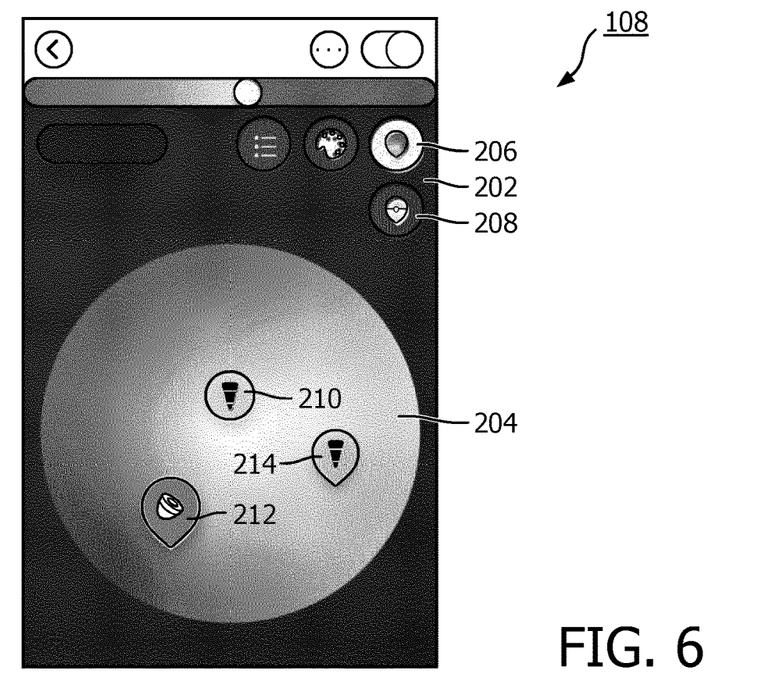
Figure 7:
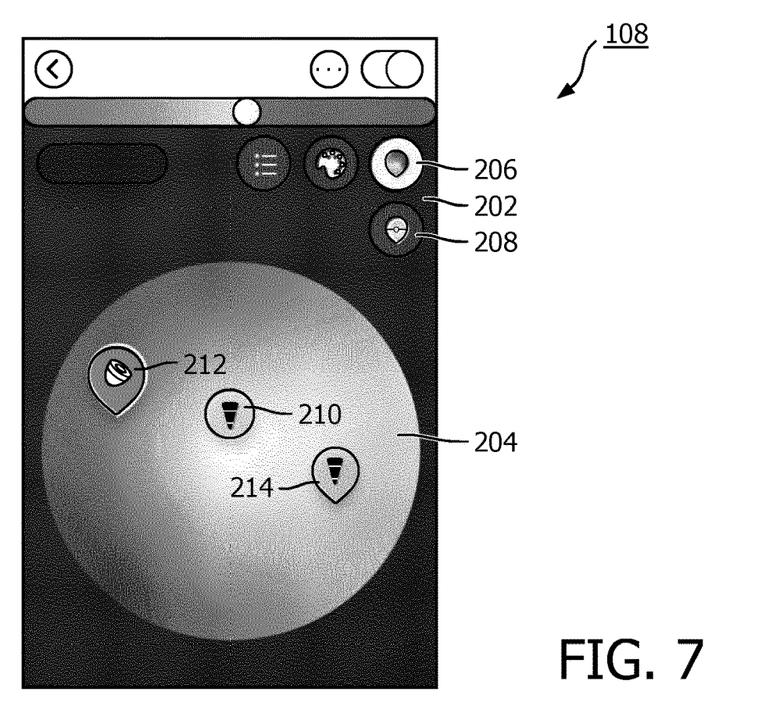

FIG. 5 shows a display unit 108 wherein the user interface 202 comprises a graphical representation of a first color spectrum 204 which is set at a tunable white spectrum. The display unit 108 also renders a graphical representation 210 of the first lighting device 112, a graphical representation 212 of the second lighting device 114 and a graphical representation 214 of a third lighting device. The third lighting device is only capable of generating white light of a predetermined color temperature. The graphical representations 210, 212 and 214 allow to control the lighting devices by selecting the desired color of light to be generated by the respective lighting device by moving these graphical representations within the first color spectrum 204 via the user interface 202. The graphical representations 210 is positioned in the color spectrum 204 such that a warm white color is selected as the preferred color of light. As the first lighting device 112 is a tunable white lighting device, it is capable of generating warm white light and that is indicated to the user by means of a graphical representation 210 having a normal brightness. Graphical representation 212 has a reduced brightness compared to graphical representation 210, as the second lighting device 114 is a multi-color device that is not arranged to generate (tunable) white light. The graphical representations 214 is positioned in the color spectrum 204 such that white light is selected. As the third lighting device is a white lighting device, it is capable of generating white light and that is indicated to the user by means of a graphical representation 214 having, just as graphical representation 210, a normal brightness. Hence, for a selected color spectrum 204 it is clear to the user which of the available lighting devices are capable of generating a color of light that is selected via the user interface 202. In case the user interacts with the graphical representation 212 for the second lighting device 114, the color spectrum 204 switches to a color spectrum 204 which is supported by lighting device 114, i.e. color spectrum 204 switches a multi-color spectrum 204 as shown in FIG. 6. The graphical representations 210, 212 and 214 have the same position in the user interface 202 as shown in FIG. 5, however now a different color is selected within the color spectrum 204. Now the graphical representation 212 for the second lighting device 114 is shown in normal brightness, whereas the graphical representations 210 and 214 for the first lighting device 212 and the third lighting device, respectively, are shown in reduced brightness on the user interface 202 as these lighting devices are not arranged to generate the color of light as is now selected on the user interface 202 by the respective positions of the graphical representations 210 and 214 in the color spectrum 204. The user may select other colors within the color spectrum 204 by moving the graphical representation 212 along the color spectrum 204, e.g. select a red color as shown in FIG. 7.

Figure 8:
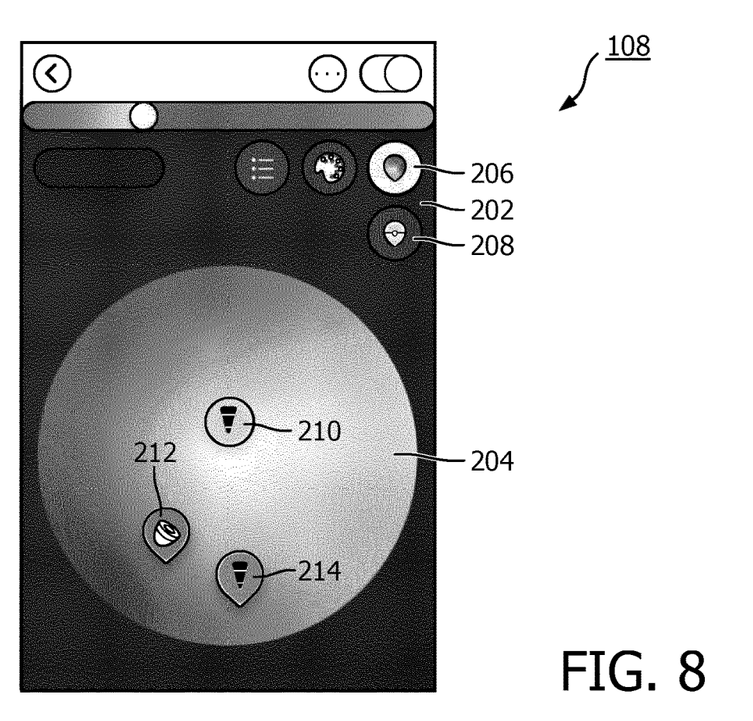
Figure 9:
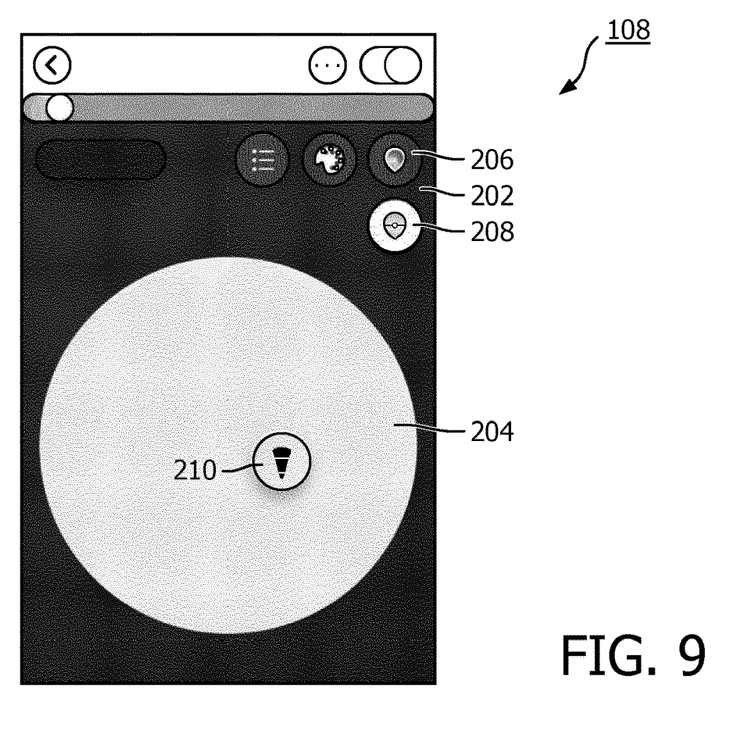

FIG. 8 shows a display unit 108 wherein the user interface 202 comprises a graphical representation of a first color spectrum 204 which is set at a multi-color spectrum. The display unit 108 also renders a graphical representation 210 of the first lighting device 112, a graphical representation 212 of the second lighting device 114 and a graphical representation 214 of a third lighting device. The third lighting device is capable of generating multi-color light. The graphical representations 210, 212 and 214 allow to control the lighting devices by selecting the desired color of light to be generated by the respective lighting device by moving these graphical representations within the first color spectrum 204 via the user interface 202. The graphical representation 210 is related to the first lighting device 212 which is a tunable white lighting device. As a multi-color spectrum 204 is selected by the user, the graphical representation 210 is shown with reduced brightness. Graphical representation 212 has a normal brightness, as the second lighting device 214 is a multi-color device. The graphical representation 214 is shown at normal brightness as he third lighting device is multi-color lighting device. In case the user interacts with the graphical representation 210 for the first lighting device 112 by moving it over the color spectrum 204, the color spectrum 204 switches to a spectrum 204 with a single tone (i.e. a neutral appearance) to indicate to the user that the lighting device 112 is not suitable to generate the desired colors of light, see FIG. 9. In alternative embodiments, other types of color spectra may be used to inform the user. The graphical representation 210 will subsequently move back to its original position, and the color spectrum 204 switches back to a multi-color spectrum, as shown in FIG. 8.

In an embodiment, the processor 106 detects which lighting devices are available in a certain space, for example the living room of a house, and indicates on the user interface 202 which color spectra can be selected based on the available lighting devices. Subsequently, the user may select one of the color spectra 206, 208. For each color spectrum all lighting devices available in that space are indicated on the user interface 202 and the respective graphical representations of the lighting devices indicate whether a respective lighting device may be suitable to generate light for the selected color spectrum, based on the capabilities and the last setting of the respective lighting device.

In an embodiment, in case a lighting device is suitable to generate light for multiple color spectra, the graphical representation of that lighting device is based on the last setting (for example a specific color or white appearance) that was used for that lighting device. For example, in case a lighting device is arranged to generate both tunable white light and colored light, it is suitable to use for both a tunable white light spectrum and a full color light spectrum. In case that last setting of that lighting device was for use in a tunable white light spectrum, when selecting a full color light spectrum that light source will be shown on the user interface with a graphical representation indicating that that light source is not suitable for the selected full color spectrum. In case the user interacts with that lighting device on the user interface 202, its graphical representation switches to another representation indicating that that lighting device is suitable for use for the full color light spectrum.

In an embodiment, the look of a graphical representation of a lighting device in the color spectrum 204 of the user interface 202 may change in case the lighting device is not arranged to generate the color of light corresponding to the position of the graphical representation in the color spectrum 204. For example, in case of a color spectrum 204 that contains both tunable white colors as well as full colors (e.g. red, blue, green and mixtures thereof), a tunable white lighting device is able to generate the type of light selected by a user within the tunable white color space of the color spectrum 204. As long as the graphical representation of the lighting device is within the tunable white color space of the color spectrum 204, it will show to the user that the lighting device is arranged to generate this type of light. As soon as the user moves the graphical representation of the lighting device to the other part of the color spectrum 204, representing the full colors, the graphical representation of the lighting device will change in order to indicate to the user that the lighting device is not capable of generating these full colors.

In an embodiment, in case a color spectrum 204 is selected by the user and for which a specific lighting device is not arranged to generate light that matches the selected color spectrum 204, the graphical representation of that lighting device indicates this to the user by having a selected opacity or other selected characteristic. In case the user interacts on the user interface 202 with this graphical representation of the lighting device, the color spectrum 204 will switch to a color spectrum 204 that matches with the colors that can be generated by the lighting device. The graphical representation of the lighting device will switch to another opacity, indicating to the user that this lighting device can be selected for generating light. The graphical representation of the lighting device may be moved along the color spectrum 204 in order to select the color of light that should be generated by the lighting device.

In an embodiment, when moving a graphical representation of a lighting device along the color spectrum 204 of the user interface 202, in case the lighting device is not arranged to generate the color of the light in the color spectrum 204 represented by the graphical representation, the color spectrum 204 changes to a neutral appearance, indicating to the user that the selected color cannot be generated by the lighting device. The neutral appearance may be single color, for example grayish.

Figure 10:
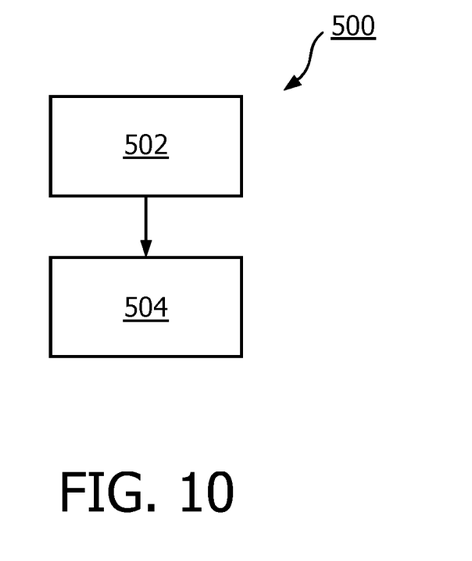
FIG. 10 shows schematically a method for controlling a first and second lighting device according to the invention.

FIG. 10 shows a method 500 for controlling a first lighting device 112 and a second lighting device 114. In a step 502, the method renders, on a display unit, a graphical representation of a first color spectrum 204, a first type of graphical representation 210 of the first lighting device 112 in the first color spectrum 204 at a first position in a user interface 202, a second type of graphical representation 212 of the second lighting device 114 in the first color spectrum 204 at a second position in the user interface, wherein the first type of graphical representation 210 is indicative for the first lighting device 112 being arranged for generating light matching a color of the first color spectrum 204 associated with the first position in the user interface 202, and the second type of graphical representation 212 is indicative for the second lighting device 114 not being arranged for generating light matching a color of the color spectrum 204 associated with the second position in the user interface 202. In a step 504, the method controls, upon receiving a first user input for controlling the first lighting device via the user interface, a color of one or more of the first and second light sources according to the first user input. In this embodiment, in further steps (not shown in FIG. 10), the method obtains color rendering information from the first lighting device and the second lighting device, wherein the color rendering information relates to color rendering capabilities of the first lighting device and the second lighting device, respectively. The method further determines, based on the color rendering information, whether the first lighting device and the second lighting device are being arranged for generating light matching the color of the first color spectrum associated with the first position and the second position in the user interface, respectively. The method further renders the first and the second light source according the first graphical representation and the second graphical representation, respectively.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A controller for controlling at least a first lighting device and a second lighting device, the controller comprising:
   a communication unit for communicating with the first and second lighting device,
   a user interface for receiving user input,
   a display unit,
   a processor for rendering, on the display unit, a graphical representation of a first color spectrum a first type of graphical representation of the first lighting device in the first color spectrum at a first position in the user interface, a second type of graphical representation of the second lighting device in the first color spectrum at a second position in the user interface, wherein the first type of graphical representation is indicative for the first lighting device being arranged for generating light matching a color of the first color spectrum associated with the first position in the user interface, and the second type of graphical representation is indicative for the second lighting device not being arranged for generating light matching a color of the first color spectrum associated with the second position in the user interface,
   wherein the processor is further arranged for controlling, upon receiving a first user input for controlling the first lighting device via the user interface, via the communication unit, the color of one or more of the first and second lighting device according to the first user input, and
   wherein color spectra are rendered in the same area of the user interface such that only a single color spectrum is rendered at a certain point in time.

2. A controller according to claim 1, wherein the processor is further arranged for:
   moving, upon receiving a second user input for controlling the second lighting device via the user interface, the second graphical representation of the second lighting device in the first color spectrum associated with the second position in the user interface to a third position in the user interface, wherein the second lighting device is being arranged for generating light matching a color of the first color spectrum associated with the third position in the user interface, and for switching to the first type of graphical representation for the second lighting device.

3. A controller according to claim 1, wherein the color of the first color spectrum associated with the first position in the user interface is associated with one or more pixels at the first position in the user interface and wherein the color of the first color spectrum associated with the second position in the user interface is associated with one or more pixels at the second position in the user interface.

4. A controller according to claim 1, wherein the processor is further arranged for:
   obtaining color rendering information from the first lighting device and the second lighting device, wherein the color rendering information relates to color rendering capabilities of the first lighting device and the second lighting device, respectively,
   determining, based on the color rendering information, whether the first lighting device and the second lighting device are being arranged for generating light matching the color of the first color spectrum associated with the first position and the second position in the user interface, respectively,
   rendering, on the display unit, the first and the second lighting device according the first graphical representation and the second graphical representation, respectively.

5. A controller according to claim 1, wherein the processor is further arranged for, upon receiving a third user input for controlling the second lighting device via the user interface, rendering on the display unit:
   a graphical representation of a second color spectrum, the first color spectrum being different from the second color spectrum,
   the second type of graphical representation for the first lighting device in the second color spectrum at the first position in the user interface, if the first lighting device is not being arranged for generating light matching a color of the second color spectrum associated with the first position in the user interface, the first type of graphical representation for the second lighting device in the second color spectrum at the second position in the user interface indicating that the second lighting device is being arranged for generating light matching a color of the second color spectrum associated with the second position in the user interface, and for controlling, via the communication unit, the color of one or more of the first and second light sources according to the third user input.

6. A controller according to claim 1, wherein the processor is further arranged for, upon receiving a user input via the user interface, rendering on the display unit:

a graphical representation of a third color spectrum, the third color spectrum being different from the first color spectrum, the second type of graphical representation for the first lighting device in the third color spectrum at the first position in the user interface, if the first lighting device is not being arranged for generating light matching a color of the third color spectrum associated with the first position in the user interface, the first type of graphical representation for the second lighting device in the third color spectrum at the second position in the user interface indicating that the second lighting device is being arranged for generating light matching a color of the third color spectrum associated with the second position in the user interface.

7. A controller according to claim 1, wherein the processor is further arranged for, upon receiving a fourth user input via the user interface to:

move the first type of graphical representation of the first lighting device in the first color spectrum from the first position in the user interface to a fourth position in the user interface and/or to move the second type of graphical representation of the second lighting device in the first color spectrum from the second position in the user interface to fifth position in the user interface, and switch, on the display unit, to a fourth color spectrum wherein the fourth color spectrum is indicative for the first lighting device not being arranged for generating light matching a color of the first color spectrum associated with the fourth position in the user interface and/or the second lighting device not being arranged for generating light matching a color of the first color spectrum associated with the fifth position in the user interface.

8. A controller according to claim 1, wherein the color spectra are selected from a white color spectrum and a spectrum comprising multiple colors.

9. A controller according to claim 1, wherein the processor is further configured to set an initial first position for the first type of graphical representation in the user interface and/or an initial second position for the second type of graphical representation in the user interface based on the current color setting of the first lighting device and the second lighting device, respectively.

10. A controller according to claim 1, wherein the display unit has a touch sensitive display, and wherein the user interface is arranged to receive the user input via the touch sensitive display.

11. A method a for controlling a first lighting device and a second lighting device, the method comprising the steps of:

rendering, on a display unit, graphical representation of a first color spectrum, a first type of graphical representation of the first lighting device in the first color spectrum at a first position in a user interface a second type of graphical representation of the second lighting device in the first color spectrum at a second position in the user interface, wherein the first type of graphical representation is indicative for the first lighting device being arranged for generating light matching a color of the first color spectrum associated with the first position in the user interface, and the second type of graphical representation is indicative for the second lighting device not being arranged for generating light matching a color of the color spectrum associated with the second position in the user interface, wherein color spectra are rendered in the same area of the user interface such that only a single color spectrum is rendered at a certain point in time, controlling, upon receiving a first user input for controlling the first lighting device via the user interface, a color of one or more of the first and second light sources according to the first user input.

12. A method according to claim 11, further comprising the step of:

obtaining color rendering information from the first lighting device and the second lighting device, wherein the color rendering information relates to color rendering capabilities of the first lighting device and the second lighting device, respectively, determining, based on the color rendering information, whether the first lighting device and the second lighting device are being arranged for generating light matching the color of the first color spectrum associated with the first position and the second position in the user interface, respectively, rendering the first and the second light source according the first graphical representation and the second graphical representation, respectively.

13. A method according to claim 11, wherein the first color spectrum and the second color spectrum are being rendered in the same area of the user interface.

14. A computer program product for a computing device, the computer program product comprising computer program code to perform the method of claim 11 when the computer program product is run a processing unit of the computing device.

15. A lighting system comprising:
a controller according to claim 1,
at least a first lighting and a second lighting device configured to receive control commands from the controller.

* * * * *